J. L. KLEINMAN.
REVERSIBLE WINDOW.
APPLICATION FILED MAY 22, 1915.

1,187,915.

Patented June 20, 1916.
4 SHEETS—SHEET 1.

WITNESSES:
Frank C. Palmer
Hed G. Hostetz

INVENTOR
Jacob L. Kleinman
BY
ATTORNEY

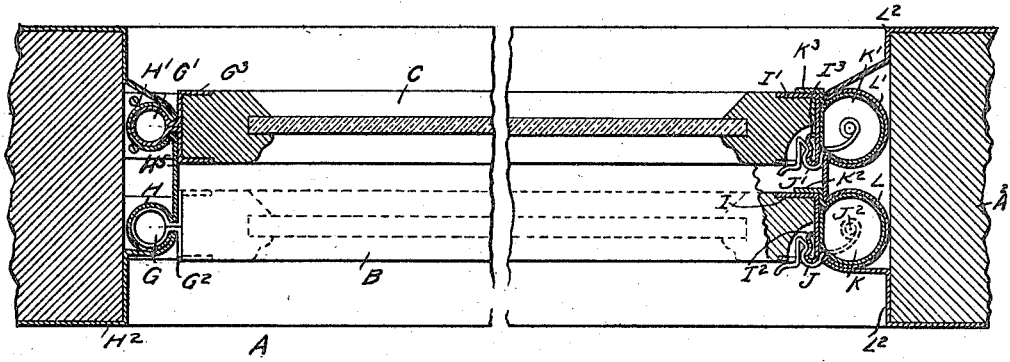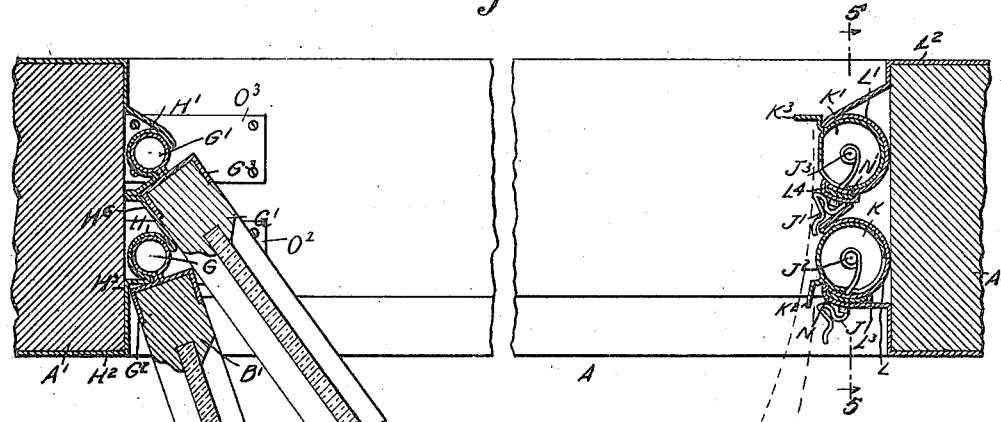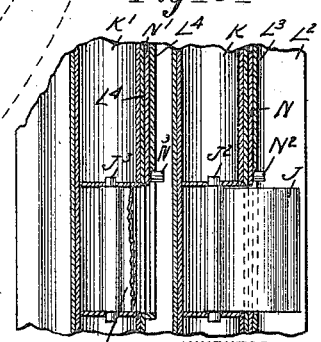

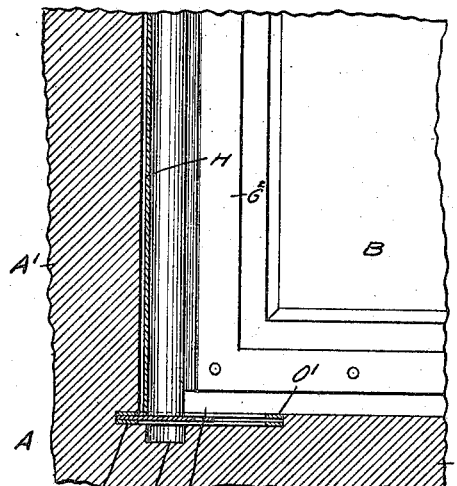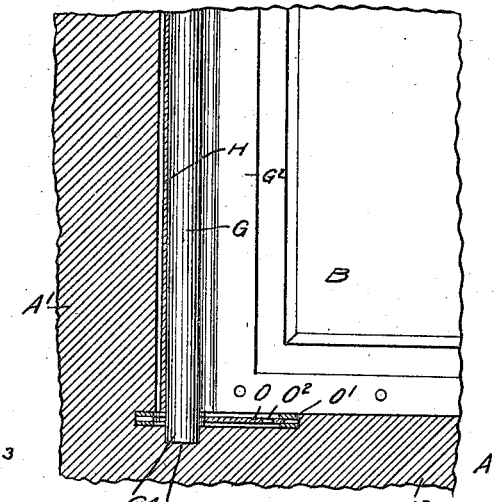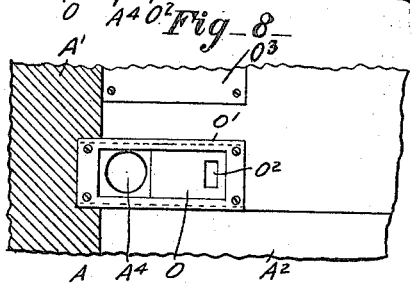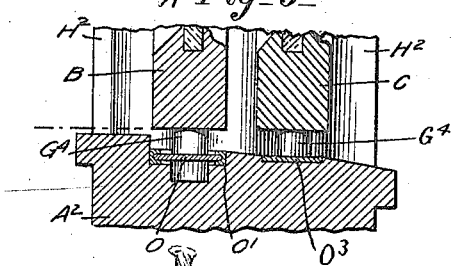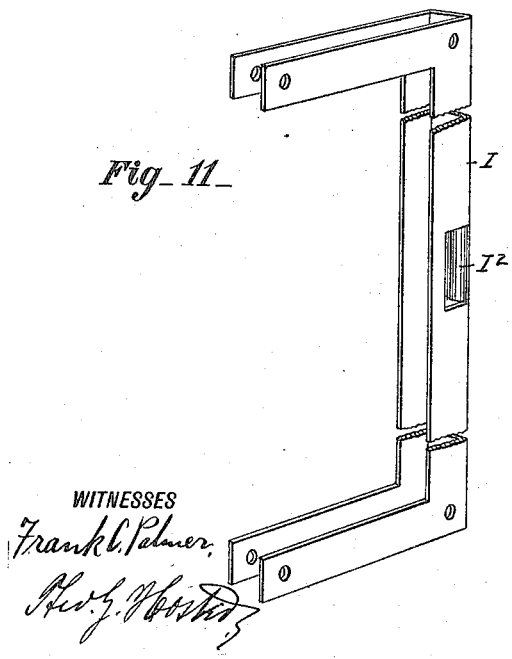

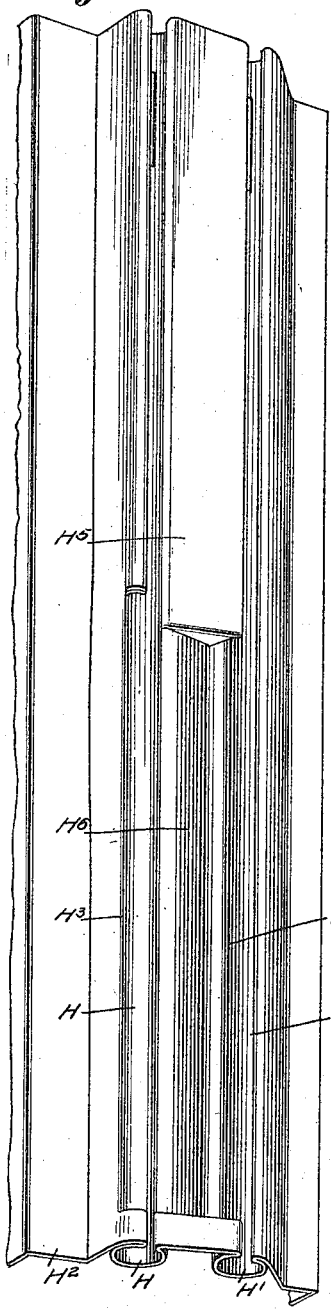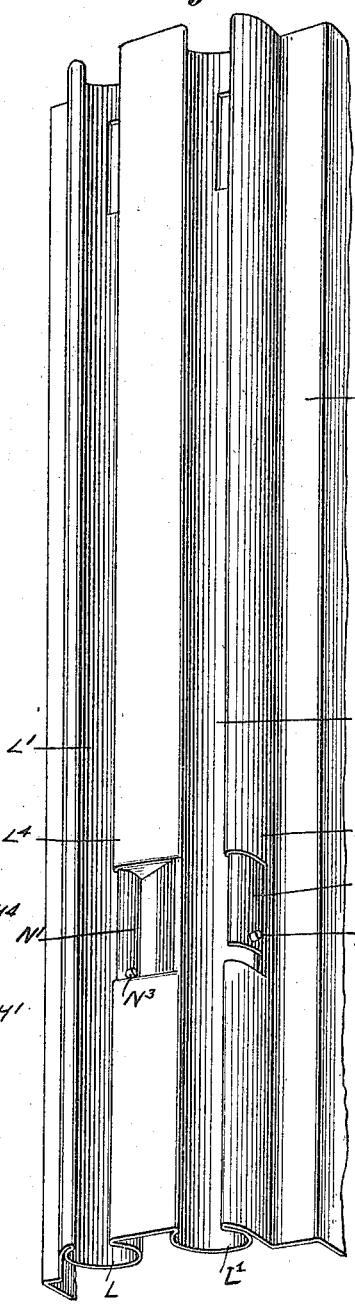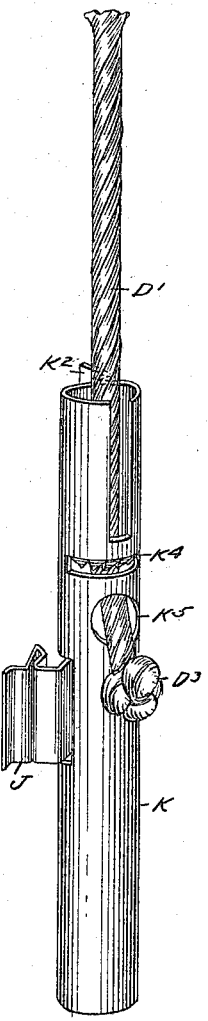

UNITED STATES PATENT OFFICE.

JACOB L. KLEINMAN, OF NEW YORK, N. Y.

REVERSIBLE WINDOW.

1,187,915.  Specification of Letters Patent.  Patented June 20, 1916.

Application filed May 22, 1915. Serial No. 29,812.

*To all whom it may concern:*

Be it known that I, JACOB L. KLEINMAN, a citizen of the United States, and a resident of the city of New York, borough of Manhattan, in the county and State of New York, have invented a new and Improved Reversible Window, of which the following is a full, clear, and exact description.

The invention relates to windows having sashes mounted to slide up and down and to swing into a room to permit of conveniently cleaning both the inner and outer faces of the sashes.

The object of the invention is to provide a new and improved reversible window of the type referred to, and one which is simple and durable in construction, cheap to manufacture and arranged to prevent leakage when the sashes are in normal closed position.

In order to produce the desired result, use is made of means for connecting a sash at one side of the window frame by sliding and hinged connections, and locking and sliding means mounted to slide and to turn vertically on the other side of the window frame and adapted to engage the adjacent side rail of the sash.

A practical embodiment of the invention is represented in the accompanying drawings forming a part of this specification, in which similar characters of reference indicate corresponding parts in all the views.

Figure 1:
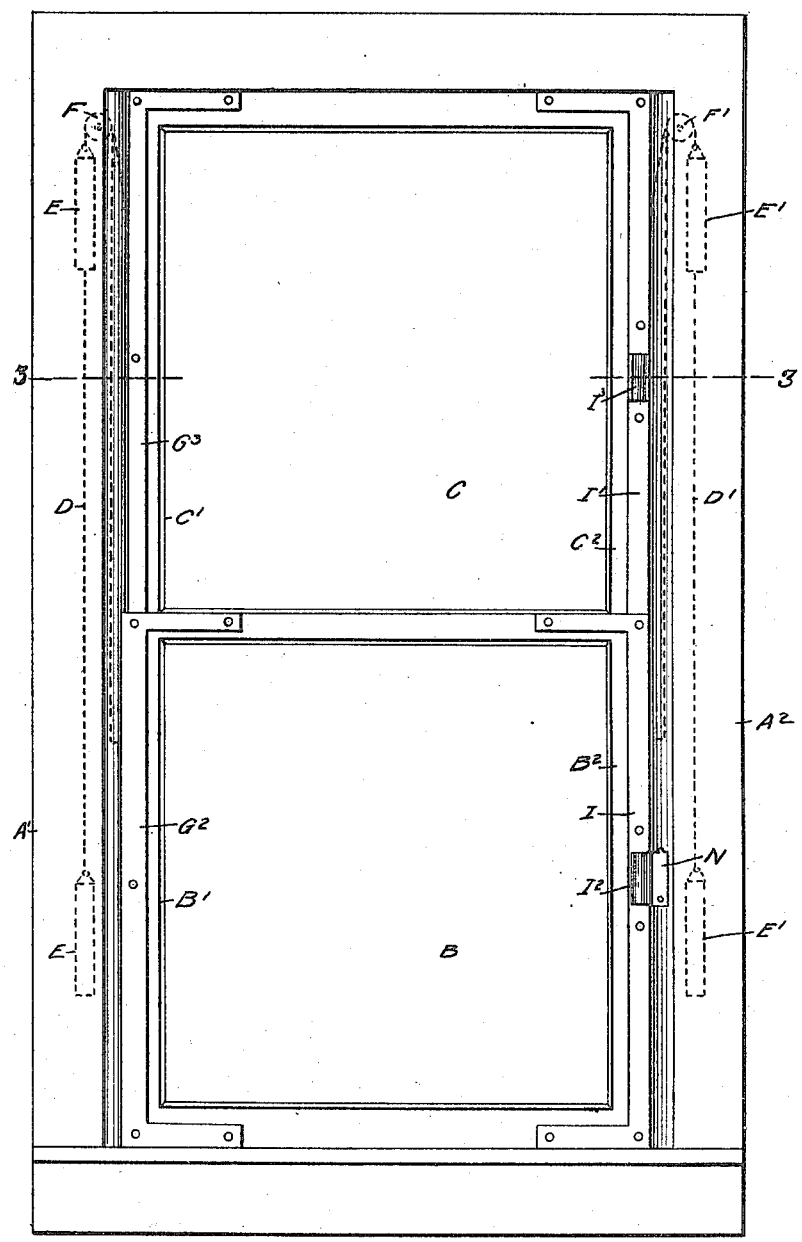
Figure 2:
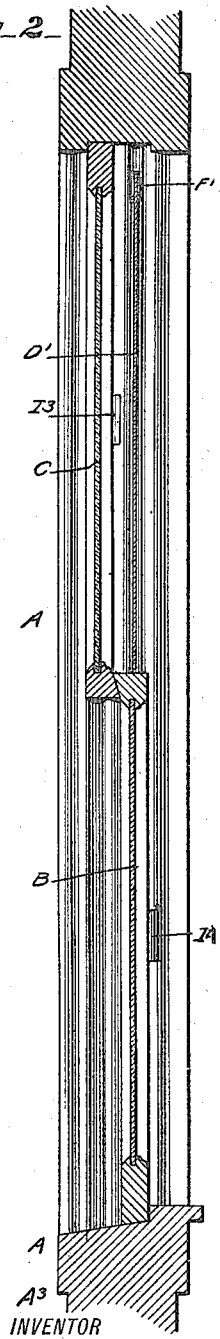

Figure 1 is a face view of the reversible window with the sashes in closed position; Fig. 2 is a transverse section of the same; Fig. 3 is an enlarged sectional plan view of the same on the line 3—3 of Fig. 1 and with a portion of the lower sash in section; Fig. 4 is a similar view of the same with both sashes swung into the room for cleaning purposes; Fig. 5 is a cross section of the same on the line 5—5 of Fig. 4; Fig. 6 is a sectional side elevation of the support for the pivot of the lower sash when the latter is to be swung into the room; Fig. 7 is a similar view of the same with the support in open position to allow of moving the sash into lowermost position; Fig. 8 is a plan view of the support as applied and in open position; Fig. 9 is a cross section of the window with the sashes in lowermost position and the lower sash supported above the sill to allow of swinging it into the room; Fig. 10 is a perspective view of the pivot of one of the sashes and its connection with the sash cord; Fig. 11 is a perspective view of the keeper on the bracket attached to the free end of each sash; Fig. 12 is a perspective view of the bearings on one jamb of the window casing; Fig. 13 is a similar view of the bearings on the other jamb of the window casing; and Fig. 14 is a perspective view of one of the slides and locking devices for the free end of a window sash and its connection with the corresponding sash cord.

The window in its general construction as shown in Figs. 1 and 2 consists of a window frame A, lower and upper sashes B and C and the usual sash cords D, D' carrying sash weights E, E' and passing over pulleys F, F' to counterbalance each sash B and C and thus allow of conveniently and easily moving the same up and down. The sashes B and C are provided at one side rail, preferably the left-hand side rail B' or C', with vertically disposed pivots G, G' mounted to turn and to slide in vertically disposed bearings or guideways H, H', preferably formed of a single piece of sheet metal $H^2$ attached to the left jamb A' of the window frame A. By the arrangement described, the hinged connections are formed by the use of the pivots G, G' and the bearings H, H', thus allowing of swinging the sashes B and C into the room for cleaning purposes, as will be readily understood by reference to Fig. 4. The pivots G, G' are preferably each made from a single piece of sheet metal bent into tubular form and terminating in brackets $G^2$, $G^3$ secured to the corresponding side rail B', C' of the lower sash B and the upper sash C thereby reinforcing the said sashes. The side rails $B^2$, $C^2$ on the other sides of the lower and upper sashes B and C are provided with brackets I, I' and with integral keepers $I^2$, $I^3$ adapted to be engaged by spring catches J, J' mounted to swing on vertical pivots $J^2$, $J^3$ held in slides K and K' mounted to slide up and down in guideway L, L', preferably formed of a single piece of metal $L^2$ attached to the right-hand jamb $A^2$ of the window frame A. The pivots G, G' are connected with the corresponding sash cords D (see Fig. 10) while the slides K, K' are connected with the corresponding sash cords D' (see Fig. 14). The slide K is provided with an abutment flange $K^2$ on which abuts the outer face of the bracket I at the time the lower sash B is in normal position, as indicated in Fig. 5, and at the time the catch J engages the keeper I². Thus the free end of the sash B is locked to the slide K so as to move up and down with the same. The slide K' is also provided with an abutment flange K³ for the bracket I' to rest against at the time the sash C is in its normal position and the catch J' engages the keeper I³, as shown in Fig. 3. The slide K besides having up and down movement in its guide L is free to turn therein from normal position, as shown in Fig. 3, to the position shown in Fig. 4, to swing the abutment flange K² out of the path of the upper sash C when the latter is to be swung into the room, as indicated in the said Fig. 4.

In order to hold the spring catches J and J' locked when in engagement with the keepers I², I³, use is made of locking plates N, N' mounted to slide up and down in pockets L³, L⁴ formed in the front walls of the bearings L and L', as plainly shown in Figs. 3, 4, 5 and 13. The locking plates N and N' are provided with short handles N², N³ adapted to be taken hold of by the operator to slide the plates up into open position to allow of swinging the catches J, J' into open position or to slide the said locking plates N, N' downward at the time the locking catches J, J' are in engagement with the keepers I², I³ to prevent the said catches J, J' from swinging accidentally into open position. It is understood that portions of the front walls of the bearings L and L' are cut out opposite the catches J, J' and the cut-out portions are closed by the plates N, N' when the latter are in lowermost position.

The lower halves of the front portions H³, H⁴ of the bearings H and H' are less in width than the upper halves thereof, as will be readily understood by reference to Figures 3, 4 and 12, to allow of swinging the sashes B and C into full open position, as indicated in Fig. 4. In a like manner the connecting part between the bearings H and H' extends transversely in the upper portion H⁵ while the lower portion H⁶ is inclined to allow of swinging the upper sash C fully open at the time the said upper sash is in lowermost position and its catch J' is disengaged from the keeper I³.

In order to limit the downward sliding movement of the sashes B and C whenever the latter is to be swung into the room so as to clear the top of the sill A², the following arrangement is made: The lower ends G⁴ of the pivots G' are extended downward below the bottom of the sash B and the extended end G⁴ of the pivot is adapted to pass into a recess A⁴ formed in the sill A³ of the window frame A in alinement with the bearing H. Thus when the sash B is lowered until its bottom reaches the sill then the lower end G⁴ of the pivot G extends in the recess A⁴, as plainly indicated in Fig. 7.

When, however, it is desired to swing the sash B into the room then the sash B is raised sufficiently above the sill to clear the same with the lower end G⁴ then resting on the top of a plate O mounted to slide in a guideway O' arranged in the top of the sill A³ (see Figs. 6, 7, 8 and 9). When the plate is in open position, as shown in Fig. 8, it uncovers the recess A⁴ to allow the end G⁴ of the pivot G to pass into the said recess, as indicated in Fig. 7, but when the sash B is raised and the plate O is moved to the left by the operator then it covers the recess A⁴ and the downward movement of the sash B is now limited so that the bottom of the end G⁴ rests on top of the plate O. The bottom of the sash B is now above the sill to allow of swinging the sash B into the room, as will be readily understood by reference to Figs. 6 and 9. The plate O is preferably provided with a slot O² for engagement by the operator, to move the plate into open or closed position, as above explained. When the upper sash C is in alinement position the lower end G⁴ of the pivot G' of the upper sash C rests on a plate O³ let into the top of the sill A³, thus allowing the bottom of the sash C to clear the sill when it is desired to swing the sash into the room (see Fig. 9).

By reference to Figs. 10 and 14, it will be noticed that the sash cords D and D' extend a distance down in the tubular pivot G and the slide K, and portions G⁵, K⁴ of the said pivot and slide are bent inward and notched to clampingly engage the sash cords D, D' and the knots D², D³ at the ends of the said sash cords. The pivot G and the slide K are provided below the portions G⁵ and K⁴ with openings G⁶, K⁵ for the passage of the lower ends of the sash cords, to allow of tying the knots D², D³ therein prior to returning the said knots to the interior of the pivot G and the slide K by way of the openings G⁶ and K⁵. The upper ends G⁷ of the pivots G and G' are slightly extended beyond the tops of their sashes B and C so as to remain in contact with the upper portions of the bearings H and H' at the time the sashes are in lowermost position for being swung into the room, as hereinafter more fully explained. The upper ends G⁷ of the pivots G, G' are adapted to pass into recesses in the top of the window frame whenever the said sashes are moved into uppermost positions. The extreme lower portions of the bearings H and H' are not reduced, as will be understood by reference to Fig. 12, so that the lower ends of the pivots G and G' remain in full engagement with the said bearings to hold the sashes against accidental disengagement from the bearings when swung into open position.

The operation is as follows: When the sashes B and C are in normal position the free ends thereof are locked to the slides K and K' by the catches J, J' engaging the keepers I², I³, and the catches J, J' are locked against accidental opening by the locking plates N, N', as previously explained. The sashes B and C can now be moved up and down in the usual manner, it being understood that the pivots G, G' and the slides K, K' move with the said sashes. When it is desired to swing the sashes B and C into the room then the sash B is slightly raised until the lower end G⁴ clears the plate O to allow the operator to slide the plate O to the left over the recess A⁴ so that the bottom of the end G⁴ can rest on top of the plate O. The operator now moves the plate N upward into open position to allow the operator to swing the catch J to the right out of engagement with the keeper I². When this has been done the lower sash B can be swung into the room. The operator next turns the slide K in its guideway L so that the abutment flange K² moves out of the path of the upper sash C. The upper sash C is next moved downward until the end G⁴ of its pivot G rests on the plate O³, and then the plate N' is moved upward into open position to allow the operator to swing the catch J' out of engagement with the keeper I³. When this has been done the upper sash C can be swung into the room, as indicated in Fig. 4. Both sashes B and C can now be readily cleaned on their outer faces, and when this has been done the upper sash C is swung outward until it abuts against the abutment flange K³, after which the catch J' is reëngaged with the keeper J³ and the plate N' is moved downward to hold the catch J' against accidental opening. The operator next turns the slide K in the reverse direction so that the abutment flange K² moves into outermost position, and then the lower sash B is swung outward until it abuts against the said flange K². The operator now reëngages the catch J with the keeper I² and pulls down the plate N, to lock the catch J against accidental opening. The operator next moves the plate O back to the right into open position to permit the lower end G⁴ of the pivot G to pass into the recess A⁴.

Having thus described my invention, I claim as new and desire to secure by Letters Patent:

1. In a window, the combination of a window frame provided at its jamb with a vertical tubular slotted bearing, a sash, a slide having an abutment for the sash to rest on, and slidable in the bearing on the jamb, the slide having a locking member and being rotatable in said bearing to swing its abutment toward the jamb, and a keeper on the sash adapted to be engaged by the said locking member to lock the sash to the slide.

2. In a window, the combination of a window frame provided at its jamb with a vertical tubular slotted bearing, a sash, a slide having an abutment for the sash to rest on and slidable in the bearing on the jamb, the slide having a locking member, and a keeper on the sash adapted to be engaged by the said locking member to lock the sash to the said slide, the said bearing for the slide having a cutout portion for the locking member to pass into on swinging the same into unlocked position, and movable means normally closing the said cut out portion.

3. In a window, the combination of a window frame provided at its jamb with a vertical tubular slotted bearing, a sash, a slide having an abutment for the sash to rest on and slidable in the bearing on the other jamb, the slide having a locking member, a keeper on the sash adapted to be engaged by the said locking member to lock the sash to the said slide, and a locking means for the said locking member to lock the latter in place when in engagement with the keeper.

4. In a window, the combination of a window frame having a jamb, a tubular slotted bearing on the said jamb, a sash, a tubular slide mounted to slide in the bearing, a keeper on one side of the said sash, and a catch on the said slide and adapted to engage the said keeper to lock the slide to the sash.

5. In a window, the combination of a window frame having a jamb, a tubular slotted bearing on the said jamb, a sash, a tubular slide mounted to slide and to turn in the bearing, the said slide having an abutment flange adapted to be engaged by one side of the sash, a keeper on the side of the sash, and a spring catch pivoted on the said slide and adapted to engage the said keeper.

6. In a window, the combination of a window frame having a jamb, a tubular slotted bearing on the said jamb, a sash, a tubular slide mounted to slide and to turn in the bearing, the said slide having an abutment flange adapted to be engaged by one side of the sash, a keeper on the side of the sash, a spring catch pivoted on the said slide and adapted to engage the said keeper, and a locking plate slidable up and down on the said bearing and adapted to lock the said catch against opening at the time it is in engagement with the keeper.

7. In a window, the combination of a window frame having a jamb and a sill, the latter being provided in its top with a recess, a tubular bearing on the said jamb, a sash provided at one side with a pivot engaging the said bearing, the lower end of the pivot projecting below the bottom of the sash to engage the said sill recess.

8. In a window, the combination of a window frame having a jamb and a sill, the latter being provided in its top with a recess, a tubular bearing on the said jamb, a sash provided at one side with a pivot engaging the said bearing, the lower end of the pivot projecting below the bottom of the sash to engage the said sill recess, and a supporting plate mounted to slide sidewise on the said sill to cover or uncover the said recess and to form a support for the lower end of the pivot to rest on to hold the bottom of the sash above the top of the sill.

9. In a window, the combination of a window frame having jambs, a plate held on the said jambs and formed from a single piece of metal bent to form two vertical and slotted guideways, said guideways having a portion of the fronts of their lower portions less in width than the upper portions, and having the upper connecting portion between the guideways extending transversely and having the lower connecting portion inclined, and upper and lower sashes provided at one side rail with pivots slidably and turnably engaging the guideways of the said plate.

10. In a window, the combination of a window frame, a plate held on one of the jambs of the window frame and formed from a single piece of metal bent to form two vertical tubular slotted guideways, the guideways having a portion of the fronts of the lower portions less in width than the upper portions, and upper and lower sashes provided at one side rail with tubular pivots slidably and turnably engaging the said guideways, the said pivots projecting beyond the top and bottom of the sash, the height of the latter corresponding to the height of the said narrow lower front portions of the guideways to allow of swinging the sashes laterally.

11. In a window, the combination of a window frame having jambs and a sill, a tubular slotted bearing on one of the said jambs, a sash provided at one side with a vertical pivot engaging the said bearing, the lower end of the pivot projecting downward beyond the bottom of the sash, and a plate on the sill for the said lower pivot end to rest on to hold the bottom of the sash clear of the top of the sill.

In testimony whereof I have signed my name to this specification in the presence of two subscribing witnesses.

JACOB L. KLEINMAN.

Witnesses:
THEO. G. HOSTER,
PHILIP D. ROLLHAUS.

Copies of this patent may be obtained for five cents each, by addressing the "Commissioner of Patents, Washington, D. C."